United States Patent
Lau et al.

(10) Patent No.: US 9,130,442 B2
(45) Date of Patent: *Sep. 8, 2015

(54) PERMANENT MAGNET MOTOR

(75) Inventors: James Ching Sik Lau, Hong Kong (CN); Chun Kit Cheung, Hong Kong (CN); Duncan Yiu Lung Wong, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 254 days.

This patent is subject to a terminal disclaimer.

(21) Appl. No.: 13/360,259

(22) Filed: Jan. 27, 2012

(65) Prior Publication Data

US 2012/0194023 A1    Aug. 2, 2012

(30) Foreign Application Priority Data

Jan. 27, 2011    (CN) .................. 2011 2 0032914 U

(51) Int. Cl.

| H02K 21/26 | (2006.01) |
|---|---|
| H02K 11/02 | (2006.01) |
| H02K 23/04 | (2006.01) |
| B25F 5/00 | (2006.01) |

(52) U.S. Cl.

CPC *H02K 23/04* (2013.01); *B25F 5/00* (2013.01); *H02K 11/026* (2013.01); *H02K 2213/03* (2013.01)

(58) Field of Classification Search

CPC .................................................. H02K 11/026
USPC ............................................. 310/154.01, 239
See application file for complete search history.

(56) References Cited

U.S. PATENT DOCUMENTS

| 4,673,837 | A | * | 6/1987 | Gingerich et al. ............. 310/239 |
| 4,774,426 | A | * | 9/1988 | Mohr et al. .............. 310/154.22 |
| 4,926,075 | A | * | 5/1990 | Fushiya et al. ................... 310/50 |
| 5,231,322 | A | * | 7/1993 | Richards et al. ................ 310/51 |
| 5,610,456 | A | * | 3/1997 | Wille et al. ..................... 310/58 |
| 6,849,986 | B2 | * | 2/2005 | Wong ............................. 310/239 |
| 6,917,132 | B2 | * | 7/2005 | Honkura et al. ......... 310/154.22 |
| 7,352,100 | B2 | * | 4/2008 | Ito et al. ................. 310/216.011 |
| 7,368,843 | B2 | * | 5/2008 | Yokota et al. .......... 310/216.067 |
| 7,719,146 | B2 | * | 5/2010 | Takahashi et al. .............. 310/50 |
| 2010/0183460 | A1 | * | 7/2010 | Qin et al. .................... 417/423.7 |

FOREIGN PATENT DOCUMENTS

JP         2009295340 A    * 12/2009

OTHER PUBLICATIONS

Machine Translation, Enami et al., JP 2009295340 A, Dec. 17, 2009.*

* cited by examiner

*Primary Examiner* — Thomas Truong
(74) *Attorney, Agent, or Firm* — Muncy, Geissler, Olds & Lowe, P.C.

(57) ABSTRACT

An electric motor includes a stator and a rotor rotatably installed in the stator. The stator has a housing and a plurality of permanent magnets. The outer diameter of the housing is less than 40 mm and the ratio of the maximum thickness of the magnets in the radial direction of the rotor to the diameter of the rotor is in the range of 1:7 to 1:50.

19 Claims, 3 Drawing Sheets

PERMANENT MAGNET MOTOR

CROSS REFERENCE TO RELATED APPLICATIONS

This non-provisional patent application claims priority under 35 U.S.C. §119(a) from Patent Application No. 201120032914.8 filed in The People's Republic of China on Jan. 27, 2011.

FIELD OF THE INVENTION

This invention relates to an electric motor and in particular, to a small electric motor which may be used for electrical appliances, such as power tools.

BACKGROUND OF THE INVENTION

In the conventional art, the technology of portable power tools such as electric drills, power hammers, electric saws, electric wrenches, etc., is generally mature. A typical portable power tool comprises a casing, a motor, a gear train, and a power head driven by the motor via the gear train.

To keep a portable power tool compact and for maximum force, there is a constant demand to reduce the size of the motor and to increase the output power.

Hence there is a desire for a motor which has a high power density.

SUMMARY OF THE INVENTION

Accordingly, in one aspect thereof, the present invention provides a permanent magnet motor comprising: a stator having a housing and a plurality of magnets installed at an inner surface of the housing; and a rotor installed in the stator, wherein the outer diameter of the housing is less than 40 mm and the ratio of the maximum thickness of the magnets in the radial direction of the rotor to the diameter of the rotor is in the range of 1:7 to 1:50.

Preferably, when the outer diameter of the housing is greater than 26 mm, the maximum thickness of the magnets in the radial direction of the rotor is in the range of 0.5 to 3.5 mm.

Preferably, when the outer diameter of the housing is less than 26 mm, the maximum thickness of the magnets in the radial direction of the rotor is in the range of 0.5 to 1.4 mm.

Preferably, the maximum thickness of the magnets in the radial direction of the rotor is in the range of 0.5 to 3.5 mm and the diameter of the rotor is in the range of 7.5 to 35 mm.

Preferably, when the diameter of the stator is in the range of 12 to 20 mm, the maximum thickness of the magnets in the radial direction of the rotor is in the range of 0.5 to 1.4 mm, the diameter of the rotor is in the range of 7.5 to 12 mm and the ratio of the maximum thickness of the magnets in the radial direction of the rotor to the diameter of the rotor is in the range of 1:10 to 1:50.

Preferably, when the diameter of the stator is in the range of 20 to 23 mm, the maximum thickness of the magnets in the radial direction of the rotor is in the range of 0.5 to 1.4 mm, the diameter of the rotor is in the range of 15 to 19 mm, and the ratio of the maximum thickness of the magnets in the radial direction of the rotor to the diameter of the rotor is in the range of 1:10 to 1:50.

Preferably, when the diameter of the stator is in the range of 23 to 26 mm, the maximum thickness of the magnets in the radial direction of the rotor is in the range of 0.5 to 1.4 mm, the diameter of the rotor is in the range of 17 to 22 mm, and the ratio of the maximum thickness of the magnets in the radial direction of the rotor to the diameter of the rotor is in the range of 1:12 to 1:50.

Preferably, when the diameter of the stator is in the range of 26 to 29 mm, the maximum thickness of the magnets in the radial direction of the rotor is in the range of 0.5 to 2 mm and the diameter of the rotor is in the range of 18 to 25 mm.

Preferably, when the diameter of the stator is in the range of 29 to 32 mm, the maximum thickness of the magnets in the radial direction of the rotor is in the range of 1 to 2.5 mm and the diameter of the rotor is in the range of 18 to 30 mm.

Preferably, when the diameter of the stator is in the range of 35 to 40 mm, the maximum thickness of the magnets in the radial direction of the rotor is in the range of 2 to 3.5 mm and the diameter of the rotor is in the range of 24 to 35 mm.

Preferably, the stator further comprises a brush card installed inside the housing, brushes and an electromagnetic interference (EMI) suppression component mounted on the brush card, lead wires connected to the brushes and configured for connecting to a power source to thereby feed power to the brushes, and an end cap attached to an end of the housing and covering the brushes and the EMI suppression component, the lead wires extending through the EMI suppression component.

Preferably, the rotor comprises a shaft, a commutator fixed on the shaft, a rotor core fixed on the shaft and a winding wound on the rotor core and connected to the commutator.

Preferably, the commutator comprises a plurality of segments for making contact with the brushes, the rotor core comprises a plurality of teeth, and the winding comprises a plurality of coils wound on the teeth and each end of each coil are connected to two segments such that in operation electrified coils are connected in parallel.

Preferably, each coil is wound about a single respective tooth of the rotor core.

According to another aspect thereof, the present invention also provides a power tool comprising a casing, a motor installed in the casing, a gear train installed in the casing, and a power head driven by the motor via the gear train, wherein the motor is as described above.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The preferred embodiment of the present invention will be described with reference to FIGS. 1 to 5. It should be understood that the power tool according to the present invention can be a power drill, power hammer, electric saw, electric wrench, etc. A portable power drill will be used hereafter to explain the invention by way of example only.

Figure 1:
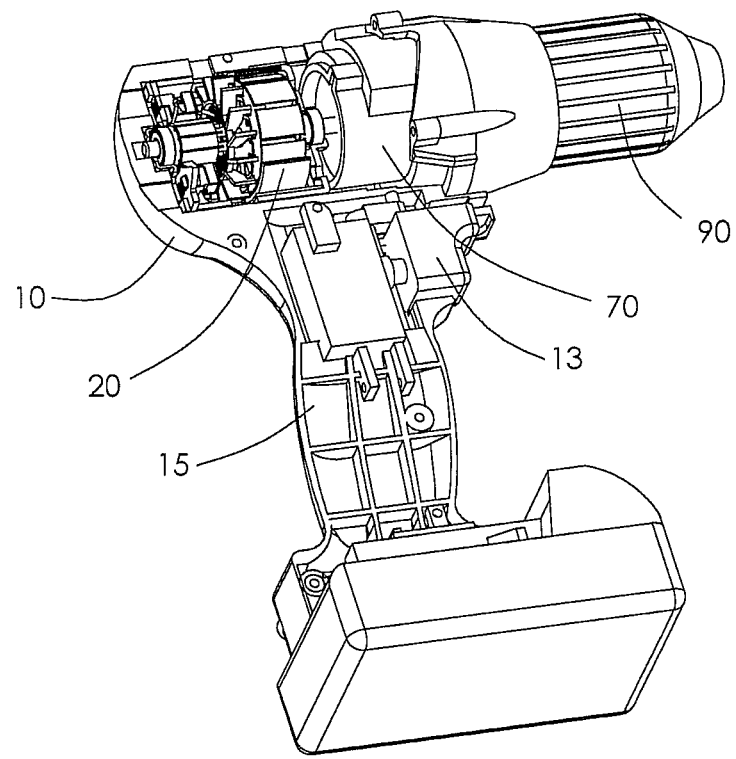
FIG. 1 is a partial sectional view of a portable power drill.

As shown in FIG. 1, the portable power drill comprises a casing 10, a motor 20 and a gear train 70 installed in the casing 10, and a power head 90 driven by the motor 20 via the gear train 70. In this embodiment, the power tool is a portable drill and the power head 90 is a chuck for holding drill bits. Operation of the drill is manually controlled by pressing a switch 13 located on a handle 15 of the casing.

Referring to FIGS. 2-5, the motor 20 is a permanent magnet motor which comprises a stator 30 and a rotor 50 rotatably mounted relative to the stator 30.

The stator 30 comprises a housing 32, a brush card 34 installed inside of the housing 32, brushes 36 and an EMI suppression component 38 installed on the brush card 34. The housing 32 has a cylindrical configuration with a closed end and an open end. The brush card 34 is installed inside the housing 32 near the open end, for installing the brushes 36 and electronic components such as chokes thereon.

The stator 30 further comprises a pair of lead wires 37 configured for connecting a power source to the brushes 36 to thereby feed power to the brushes 36. In this embodiment, the EMI suppression component 38 is a ferrite ring 38. The lead wires 37 extend through the ferrite ring 38 before passing outside of the housing 32. The stator 30 further comprises an end cap 39 fixed to the open end of the housing 32 and covering the brushes 36, the ferrite ring 38, and other electronic components.

The rotor 50 comprises a shaft 52, a rotor core 54 fixed to the shaft 52, a commutator 56 fixed to the shaft 52 and a winding formed by coils 581~586 wound on the rotor core 54 and connected to the commutator 56. The brushes 36 slidably contact the commutator 56 to provide power to the winding.

The commutator 56 comprises a plurality of segments 561~566 for making contact with the brushes 36. The rotor core 54 comprises a plurality of teeth 541~546 and the windings comprise a plurality of coils 581~586 each wound on a respective tooth. Two ends of each coil 581~586 are respectively connected to two segments 561~566. The stator 30 further comprises a plurality of permanent magnets 41~44 fixed to an inside surface of the housing 21 and facing the rotor core 54 and the coils 581~586.

In this embodiment, the stator comprises four magnet poles 41~44, the commutator comprises six segments 561~566, and the winding comprises six coils 581~586. In operation, the brushes 36 contact the segments 561~566 in turn to sequentially electrify respective groups of four coils connected in parallel.

Figure 5:
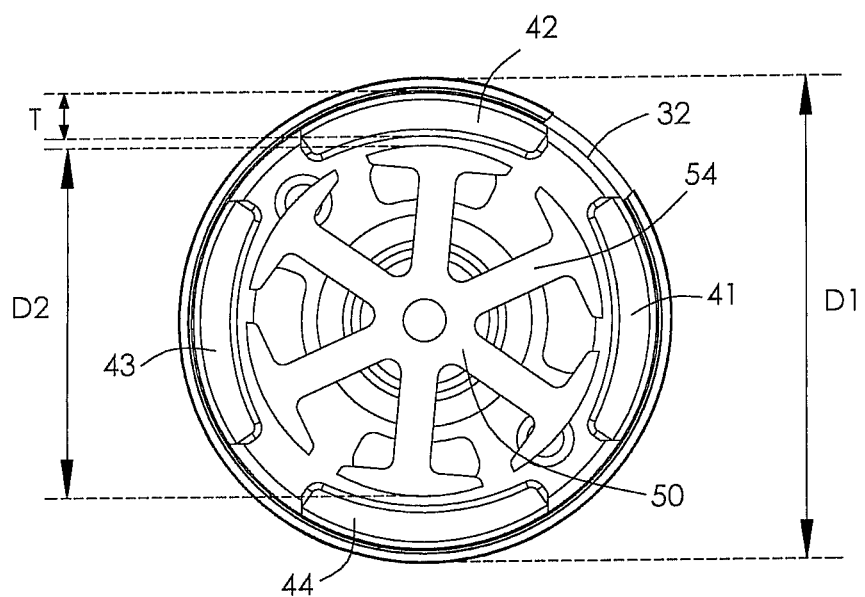
FIG. 5 is a cross sectional view of the motor of FIG. 2 with the winding omitted.
Figure 2:
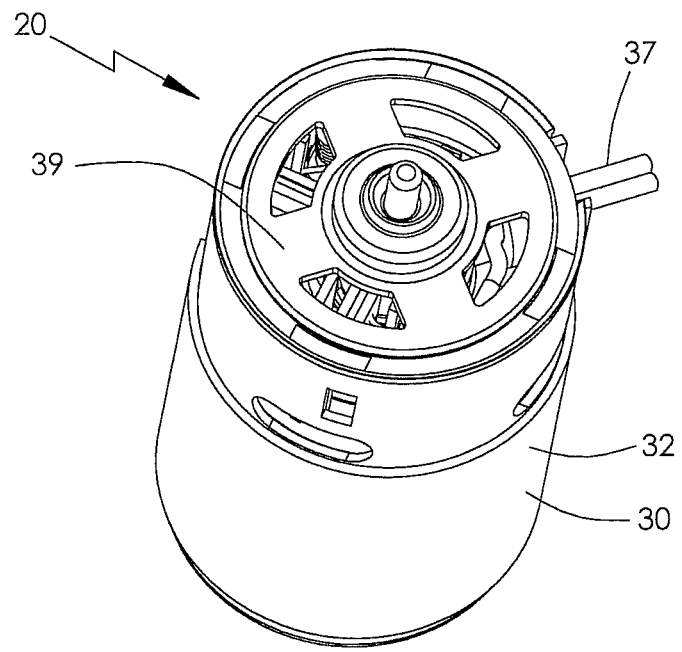
FIG. 2 illustrates an electric motor in accordance with a preferred embodiment of the present invention, as used in the power drill of FIG. 1.
Figure 3:
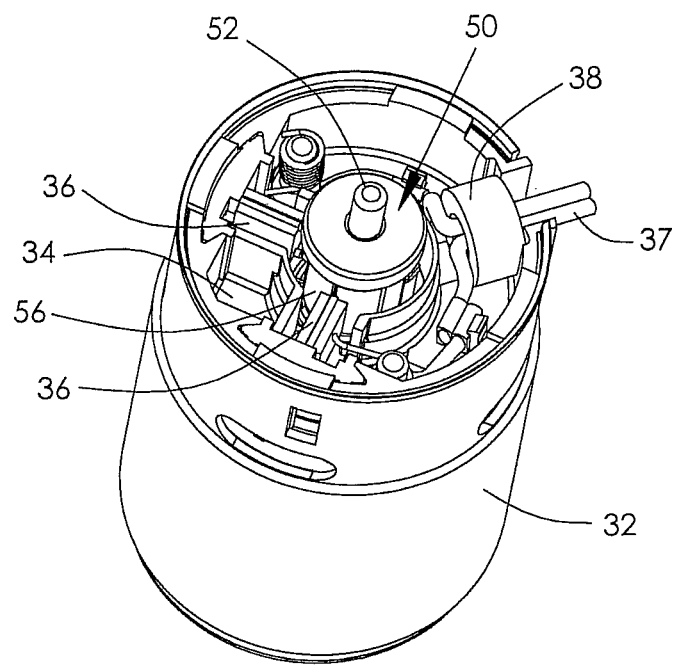
FIG. 3 illustrates the motor of FIG. 2 with an end cap thereof removed.
Figure 4:
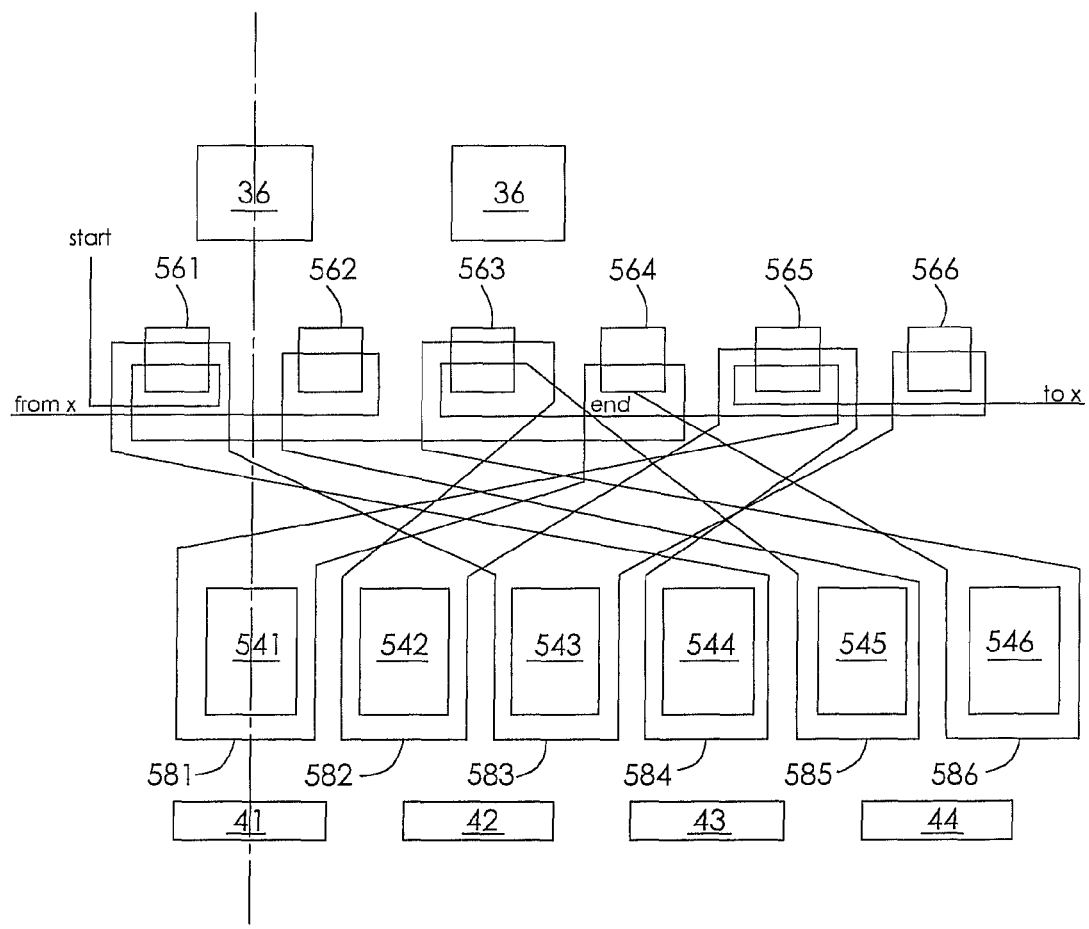
FIG. 4 illustrates a winding diagram showing the rotor winding, commutator segments, brushes, and magnets of the motor.

Referring to FIG. 5, the magnets 41~44 are preferably high energy magnets such as high grade ferrite magnets or rare earth magnets. The ratio of the maximum thickness T of the magnets 41~44 in the radial direction of the rotor to the diameter D2 of the rotor 50 is in the range of 1:7 to 1:50. The maximum thickness T of the magnets 41~44 in the radial direction of the rotor is in the range of 0.5 to 3.5 mm. The diameter D2 of the rotor 50 is in the range of 7.5 to 35 mm. The outer diameter D1 of the housing 32 is less than 40 mm.

When the diameter D1 of the stator 30 (i.e., the outer diameter of the housing 32 at a location corresponding to the location of the rotor core) is in the range of 12 to 20 mm, the maximum thickness T of the magnets 41~44 in the radial direction of the rotor is preferably in the range of 0.5 to 1.4 mm, the diameter D2 of the rotor is in the range of 7.5 to 12 mm, and the ratio of the maximum thickness T of the magnets in the radial direction of the rotor to the diameter of the rotor is in the range of 1:10 to 1:50.

When the diameter D1 of the stator is in the range of 20 to 23 mm, the maximum thickness T of the magnets 41~44 in the radial direction of the rotor is preferably in the range of 0.5 to 1.4 mm and the diameter D2 of the rotor is in the range of 15 to 19 mm, and the ratio of the maximum thickness of the magnets in the radial direction of the rotor to the diameter of the rotor is in the range of 1:10 to 1:50.

When the diameter D1 of the stator is in the range of 23 to 26 mm, the maximum thickness T of the magnets 41~44 in the radial direction of the rotor is preferably in the range of 0.5 to 1.4 mm and the diameter D2 of the rotor is in the range of 17 to 22 mm, and the ratio of the maximum thickness of the magnets in the radial direction of the rotor to the diameter of the rotor is in the range of 1:12 to 1:50.

When the diameter D1 of the stator is in the range of 26 to 29 mm, the maximum thickness T of the magnets 41~44 in the radial direction of the rotor is preferably in the range of 0.5 to 2 mm and the diameter D2 of the rotor is in the range of 18 to 25 mm.

When the diameter D1 of the stator is in the range of 29 to 32 mm, the maximum thickness T of the magnets 41~44 in the radial direction of the rotor is preferably in the range of 1 to 2.5 mm and the diameter D2 of the rotor is in the range of 18 to 30 mm.

When the diameter D1 of the stator is in the range of 35 to 40 mm, the maximum thickness T of the magnets 41~44 in the radial direction of the rotor is preferably in the range of 2 to 3.5 mm and the diameter D2 of the rotor is in the range of 24 to 35 mm.

In the present invention, high energy magnets are used and therefore the thickness T of the magnets may be reduced and the diameter D2 of the rotor may be increased accordingly, thereby increasing the power output of the motor. The ferrite ring 38 is disposed inside the motor housing 32 and does not occupy space outside of the motor. The stator has four permanent magnet poles. The power density is increased compared to a traditional power tool motor with only two magnet poles. The motor of the present invention is especially suitable for power tools.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet motor comprising:
   a stator having a housing with a cylindrical configuration and a plurality of magnets installed at an inner surface of the housing; and
   a rotor installed in the stator and having a rotor core, wherein the housing defines an outer diameter at a location corresponding to a location of the rotor core, the outer diameter of the housing is less than 40 mm and a ratio of maximum thickness of the magnets in radial direction of the rotor to a diameter of the rotor is in the range of 1:7 to 1:50 and
   wherein the stator further comprises a brush card installed inside the housing, brushes and an EMI (electromagnetic interference) suppression component mounted on the brush card, and a pair of lead wires connected to the brushes and configured for connecting to a power source to thereby feed power to the brushes, said pair of lead wires extending through the EMI suppression component, wherein the housing of the stator defines a cutout at an end thereof, the EMI suppression component has a through hole facing the cutout of the housing, said pair of lead wires extending to outside of the housing after passing through the hole and the cutout successively.

2. The motor of claim 1, wherein the outer diameter of the housing is greater than 26 mm and the maximum thickness of the magnets in the radial direction of the rotor is in the range of 0.5 to 3.5 mm.

3. The motor of claim 1, wherein the outer diameter of the housing is less than 26 mm and the maximum thickness of the magnets in the radial direction of the rotor is in the range of 0.5 to 1.4 mm.

4. The motor of claim 1, wherein the maximum thickness of the magnets in the radial direction of the rotor is in the range of 0.5 to 3.5 mm and the diameter of the rotor is in the range of 7.5 to 35 mm.

5. The motor of claim 4, wherein a diameter of the stator is in the range of 12 to 20 mm, the maximum thickness of the magnets in the radial direction of the rotor is in the range of 0.5 to 1.4 mm, the diameter of the rotor is in the range of 7.5 to 12 mm and the ratio of the maximum thickness of the magnets in the radial direction of the rotor to the diameter of the rotor is in the range of 1:10 to 1:50.

6. The motor of claim 4, wherein a diameter of the stator is in the range of 20 to 23 mm, the maximum thickness of the magnets in the radial direction of the rotor is in the range of 0.5 to 1.4 mm, the diameter of the rotor is in the range of 15 to 19 mm, and the ratio of the maximum thickness of the magnets in the radial direction of the rotor to the diameter of the rotor is in the range of 1:10 to 1:50.

7. The motor of claim 4, wherein a diameter of the stator is in the range of 23 to 26 mm, the maximum thickness of the magnets in the radial direction of the rotor is in the range of 0.5 to 1.4 mm, the diameter of the rotor is in the range of 17 to 22 mm, and the ratio of the maximum thickness of the magnets in the radial direction of the rotor to the diameter of the rotor is in the range of 1:12 to 1:50.

8. The motor of claim 4, wherein a diameter of the stator is in the range of 26 to 29 mm, the maximum thickness of the magnets in the radial direction of the rotor is in the range of 0.5 to 2 mm and the diameter of the rotor is in the range of 18 to 25 mm.

9. The motor of claim 4, wherein a diameter of the stator is in the range of 29 to 32 mm, the maximum thickness of the magnets in the radial direction of the rotor is in the range of 1 to 2.5 mm and the diameter of the rotor is in the range of 18 to 30 mm.

10. The motor of claim 4, wherein a diameter of the stator is in the range of 35 to 40 mm, the maximum thickness of the magnets in the radial direction of the rotor is in the range of 2 to 3.5 mm and the diameter of the rotor is in the range of 24 to 35 mm.

11. The motor of claim 1, wherein the stator further comprises an end cap attached to an end of the housing and covering the brushes and the EMI suppression component.

12. The motor of claim 11, wherein the EMI suppression component is a ferrite ring.

13. The motor of claim 11, wherein the rotor comprises a shaft, a commutator fixed on the shaft, the rotor core fixed on the shaft and a winding wound on the rotor core and connected to the commutator.

14. The motor of claim 13, wherein the commutator comprises a plurality of segments for making contact with the brushes, the rotor core comprises a plurality of teeth, and the winding comprises a plurality of coils wound on the teeth and each end of each coil are connected to two segments such that in operation electrified coils are connected in parallel.

15. The motor of claim 14, wherein each coil is wound about a single respective tooth of the rotor core.

16. A power tool comprising a casing, a motor installed in the casing, a gear train installed in the casing, and a power head driven by the motor via the gear train, wherein the motor is the motor of claim 11.

17. A power tool comprising a casing, a motor installed in the casing, a gear train installed in the casing, and a power head driven by the motor via the gear train, wherein the motor is the motor of claim 1.

18. A permanent magnet motor comprising:
a stator having a housing with a cylindrical configuration and a plurality of ferrite magnets installed at an inner surface of the housing; and
a rotor installed in the stator and having a rotor core, wherein the housing defines an outer diameter at a location corresponding to a location of the rotor core, the outer diameter of the housing is in the range of 35 to 40 mm, a maximum thickness of the ferrite magnets in radial direction of the rotor is in the range of 2 to 3.5 mm and a diameter of the rotor is in the range of 24 to 35 mm,
wherein the rotor comprises a shaft, a commutator fixed on the shaft, the rotor core fixed on the shaft and a winding wound on the rotor core and connected to the commutator; and
wherein the stator further comprises a brush card installed inside the housing, a pair of brushes mounted on the brush card at a side of the commutator, and an EMI (electromagnetic interference) suppression component mounted on the brush card at an opposite side of the commutator, the pair of brushes and the EMI suppression component being respectively arranged at three branches of a Y shape, a pair of lead wires connected to the pair of brushes and configured for connecting to a power source to thereby feed power to the brushes, said pair of lead wires extending through the EMI suppression component alone one of the three branches of the Y shape.

19. The motor of claim 18, wherein the housing of the stator defines a cutout at an end thereof, the EMI suppression component has a through hole facing the cutout of the housing, said pair of lead wires extending to outside of the housing after passing through the hole and the cutout successively.

* * * * *